United States Patent [19]
Sobozenski et al.

[11] 4,064,611
[45] Dec. 27, 1977

[54] METHOD FOR TERMINATING SOLID ELECTROLYTE CAPACITORS

[75] Inventors: Theodore M. Sobozenski, Concord, N.H.; Raymond E. Stupak, Pittsfield, Mass.

[73] Assignee: Sprague Electric Company, North Adams, Mass.

[21] Appl. No.: 759,305

[22] Filed: Jan. 14, 1977

[51] Int. Cl.$^2$ ............................................. B01J 17/00
[52] U.S. Cl. ........................................................ 29/270
[58] Field of Search .................... 29/570, 589; 361/433

[56] References Cited
U.S. PATENT DOCUMENTS 3,689,989  9/1972  McClamrock ......................... 29/570

*Primary Examiner*—Gerald A. Dost
*Attorney, Agent, or Firm*—Connolly and Hutz

[57] ABSTRACT

Thin rectangular metal cups are press fitted into a row of rectangular holes in one and in another metal jigging strip. The patterns of holes in the two strips are identical. A small quantity of a conductive resin is dispensed into the cups of one strip and the cathode ends of a plurality of solid electrolyte capacitor bodies are pushed, preferably simultaneously, into the cups of this strip. A bonding resin is dispensed into the cups of the other strip and the anode ends of the capacitor bodies are pushed into the cups of this other strip. Near perfect registration and alignment of the two terminal cups of each capacitor body is achieved and the cost of terminating may be reduced in this disciplined and automatable method. These advantages are of greatest significance in terminating very small capacitors.

17 Claims, 5 Drawing Figures

METHOD FOR TERMINATING SOLID ELECTROLYTE CAPACITORS

BACKGROUND OF THE INVENTION

This invention relates to a method for terminating solid electrolyte capacitors, and more particularly to such methods that include mounting metal terminal cups to opposite ends of solid electrolyte capacitors.

Such methods are known whereby rectangular metal cups are individually placed over the ends of a rectangular solid electrolyte capacitor body with a liquid bonding material therebetween. Several difficulties are inherent in these known methods.

There is usually a substantial variation in the outer dimensions of the capacitor bodies that is a result of the numerous conformal layers and coatings having been applied to a porous valve metal pellet to form the capacitor body. These layers are generally applied by dipping, spraying or other liquid application steps and the overall dimensions are the sum of many broad thickness tolerance layers. Thus the cups to be bonded thereto do not fit well and are particularly subject to twisting and misalignment with the rectangular pellet. As a result, when the two cups have been assembled to opposite ends of a capacitor body they are not aligned with each other. The user subsequently experiences difficulty in the stable placement of the capacitor on the conductors of a printed circuit board to which they are to be soldered or otherwise connected, and the quality of the connections is adversely affected. The smaller the capacitor body is, the greater this termination misalignment tends to become.

Furthermore the individual positioning of the cups on the body by manual means is arduous and time consuming, the operator typically performing this task with tweezers and with the aid of optical magnification.

It is therefore an object of this invention to overcome the above mentioned drawbacks of known methods.

It is a further object of this invention to provide a solid electrolyte capacitor with metal cup terminations having near perfect alignment between cups.

It is a further object of this invention to provide a reduced cost batch method for making solid electrolyte capacitors with metal cup terminations.

SUMMARY OF THE INVENTION

A method for terminating solid electrolyte capacitors includes providing a plurality of capacitor bodies, each of said bodies having an anode wire extending from an anode end thereof, and applying an insulating coating over the anode end and the adjacent sides of the body so that the cathode counterelectrode is exposed at the opposite and namely the cathode end. The method further comprises forming thin metal cups of rectangular shape having a bottom and four sides, pressing a first group of these cups into rectangular holes provided therefor in a first jigging strip, which holes are in a row and spaced at predetermined intervals and at predetermined orientations. Then a plurality of the capacitor bodies are preferably spaced at the same predetermined intervals and orientations in a row. This holding may be accomplished by holding the spaced bodies in a clamp or by welding the anode wires to a holding bar, with anode wires extending in the same direction. The cathode ends are pushed, preferably simultaneously, into the first group of spaced cups after applying to the cathode ends or to the insides of the cups a conductive resin. This resin is subsequently cured.

A second group of the cups are pressed into interference fitting rectangular holes in a second jigging strip, which holes have the same pattern as in the first strip. The anode ends of the bodies are pushed, preferably simultaneously, into the second group cups with a bonding resin therebetween. Each of the anode cups may have a hole therein through which an anode wire may be threaded. These cups may also have a funnel formed in the bottom about this hole to facilitate the threading. The bonding resin is subsequently cured. An electrical connection is made between each anode wire and the corresponding of the second group cups. This may be accomplished either by welding or by including conductive particles in the bonding resin. No cup hole is necessary in the latter instance.

The above method insures that in all of the plurality of capacitors so terminated, the two terminal cups of each are in near perfect mutual alignment so that when the capacitor is lying on any one of the four capacitor sides on a plane mounting surface, each of the two cups is essentially spaced a slight uniform distance away from the plane mounting surface, promoting capillarity of molten solder while not being subject to rocking or wobbling.

Further, when it is desired to achieve a uniform length from anode to cathode ends of the completed capacitors, it is possible to axially compress to the desired length the row of jigged bodies to which all cups have been assembled, prior to curing the resin in at least one end thereof. Thus the shorter of the bodies will not be fully seated in at least one of the cups, but all of the completed capacitors will be uniformly long while retaining the near perfect cup alignment feature.

Description of the Preferred Embodiments

Figure 1:
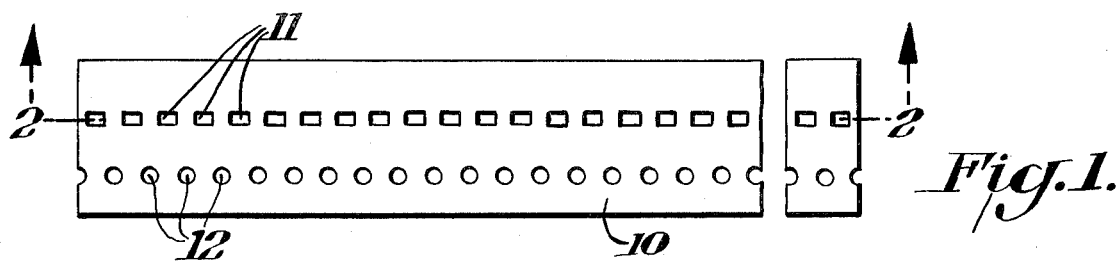
FIG. 1 shows in a top view a jigging strip, two of which are employed in the preferred method of this invention.

The jigging strip 10 shown in FIG. 1 is made of a 0.025 inch (0.063 cm.) thick sheet of aluminum. A straight row of rectangular holes 11 are provided in the strip being spaced at regular intervals. The dimensions of each hole 11 is 0.057 × 0.087 inches (0.150 × 0.230 cm.). Another row of round holes 12 have the same regular spacing and are intended for use as indexing holes to facilitate the automatic or semiautomatic registration and indexing of successive of the square holes within a fixed work station as will be further elaborated.

Figure 2:
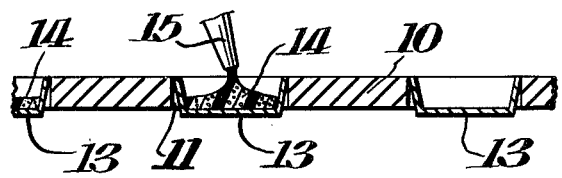
FIG. 2 shows a detail in side sectional view taken in plane 2—2 of the jigging strip, as in FIG. 1, having been loaded with press fitted metal cups.

A first jigging strip of the kind described above was made that included 50 of the rectangular holes 11. A first group of 50 rectangular cups 13 is pressed into the holes 11 as illustrated in FIG. 2. The cups 13 are gold plated nickel having a thickness of 0.005 inches (0.012 cm.). The four sides of the rectangular cups are 0.030 inches (0.076 cm.) high so that with the lips or rims of the cups pressed flush with the top surface of the jigging strip 10, the bottoms of the cups protrude below the bottom surface of the strip 10.

The outer rectangular dimensions of the bottom of the cup are smaller than those of the jigging strip holes 11 while the outer rectangular dimensions of the cups at the rims thereof are larger than those of the jigging strip holes. This is accomplished by flaring the cup sidewalls outwardly at from 1° to 4° of arc. The cups are thus press fitted in a jigging hole and when pressed flush as shown are self holding in the strip 10.

Figure 3:
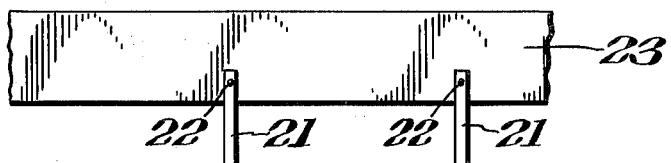
FIG. 3 shows a detail in side sectional view of a plurality of capacitor bodies having their bottom (cathode) ends conductively bonded in the cups of FIG. 2.

A predetermined quantity of an electrically conductive resin paste 14, such as an epoxy resin containing copper particles, is dispensed into each cup from a dispensing needle 15. With reference to FIG. 3, a group of solid electrolyte capacitor bodies 20 are attached at welds 22 by their anode lead wire 21 to a metal holding bar 23 at the same orientations and regular intervals as those of the holes 11 in the jigging strip 10. The holding bar 23 is moved relative to the jigging strip 10 so as to register each of the capacitor bodies 20 directly over a corresponding cup 13 in the strip 10. The cathode or bottom ends of the capacitor bodies are then simultaneously pushed into the cups 13 which causes the conductive resin 14 to be redistributed within the spaces between the inner faces of the cups and the corresponding bodies. The resin is then cured to provide a permanent physical and electrical bond therebetween. The shape and dimensions of the capacitor body may for aesthetic and/or packaging efficiency considerations be such that the body conforms to the cup cavity, but this is not functionally important to the instant method.

Figure 4:
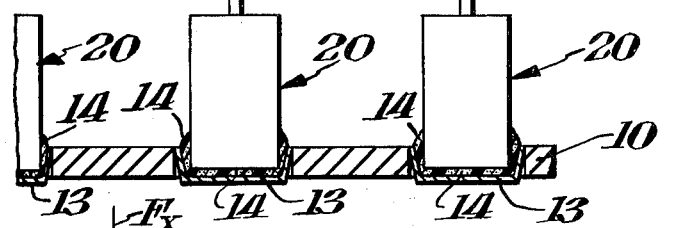
FIG. 4 shows a detail in side sectional view of the inverted assembly of FIG. 3 and additionally a second jigging strip holding cups that are bonded to the anode end of the capacitor bodies.

The anode wires are cut to separate the bar 23 from the bodies 20, the bodies being maintained in mutual registration by the jigging strip 10. With reference to FIG. 4, another jigging strip 30 of the same structure as strip 10, has pressed within the rectangular holes 31 therein, metal cups 33. The cups 33 are also thin flared gold plated nickel having the same press fit relationship with the holes 31 as that of cups 13 to holes 11. However, cups 33 have additional features, namely a bottom hole of diameter slightly larger than that of the anode wires 21 and an outwardly protruding cone or funnel formed in the bottom about the bottom hole.

A bonding resin 34 is similarly dispensed into the press fitted cups 33, the assembly of bodies 10, cups 13 and strip 10 is turned upside down. The anode leads 21 are then simultaneously threaded into the holes of cups 33. This threading step is facilitated by the funnel shaped bottoms of cups 33 and it is preferred that the funnel portion form an angle with the anode wire of between 45 and 30 degrees of arc to provide the most effective threading aid. The bodies are then pushed into the cups 33 causing a redistribution of resin 34 into the spaces between the inner faces of cups 33 and the corresponding bodies 20. The resin 34 is then cured. The anode leads 21 are welded to the bottom of corresponding cups 33, preferably by means of a laser beam that also cuts off the excess length of extending anode wires.

At this point the termination of the capacitors is complete and it only remains to remove the jigging strips 10 and 30. The strip 10 may be removed by placing a resilient sheet 35 against the protruding bottoms of cups 13, placing a stiff backing plate 36 over the resilient sheet 35 and applying squeezing forces illustrated as $F_x$ and $F_y$ in FIG. 4, between the strip 10 and plate 36. A similar means may be employed to remove the strip 30.

The above described preferred method for terminating solid electrolyte capacitors makes it possible to effect most if not all of the steps by automatic means. Furthermore if automation of some steps cannot be justified in some certain situations, they may be performed in an orderly sequential manner by manually indexing each cup and/or body held in a jigging strip in a work station. For example, the steps of pressing cups into a jigging strip, dispensing resin into each cup, and welding the anode lead to an anode cup are particularly suitable for sequential performance. Other steps such as registering and pushing the bodies into the cups, threading anode leads into anode cup holes, and curing the resin are especially suitable for multiple batch processing.

One of the major advantages of the method of this invention is the achievement of near perfect alignment of the anode cup with the corresponding cathode cup. As a result there is no rocking of the capacitor which is subsequently placed on the pads of a printed circuit pad for soldering thereto, these advantages accruing to the capacitor user who may now have better control in maintaining the placement of the capacitor and who may achieve a more reliable reflow solder connection of capacitor terminals to printed circuit conductors.

The above described method may be modified in various ways without losing the major advantages of the method. For example, it may be desirable to clamp the bodies shown in FIG. 3 between two flat stock jaws having a thin resilient padding to obtain a friction grip on each body in the middle portion thereof. Then the anode leads may be cut to remove the holding bar. By tapping the bottoms of the bodies against a flat surface, the cathode ends of the clamped bodies may be pushed into precisely a single plane prior to pushing them into the cathode cups.

In another variation, one or the other or both jigging strips may be made of an electrically insulating material so that in the stage of development illustrated in FIG. 4 (or after a further step of welding the anode wires) the capacitors are not electrically connected in parallel and may be individually tested. Of course, one strip may be removed leaving the capacitors mounted in the other metal strip for indexing past a capacitor test station.

Also an alternative to dispensing resin into the cups consists in applying the liquid resin to the end of the capacitor body as by dipping or brushing, prior to pushing the body into the cup.

It is also possible to employ cylindrical capacitor bodies instead of those of right parallepiped shape since the body itself in the method of this invention is not relied upon at all to obtain mutual alignment of its two termination cups.

It will be recognized that the desired alignment of the two termination cups is achieved in the method of this invention by employing the two strip jigs having identical patterns of holes therein. Thus this desirable result may be achieved by pushing the cathode ends into the corresponding cups, e.g. 13, one by one instead of simultaneously and/or by pushing the anode ends into the corresponding cups, e.g. 33, one by one instead of simultaneously. Also in an alternative means for connecting the anode wires electrically to the anode cups, the hole in the anode cup is omitted, the anode wire is cut short, and the bonding resin may be a conductive bonding resin to achieve the electrical connection at the anode.

Figure 5:
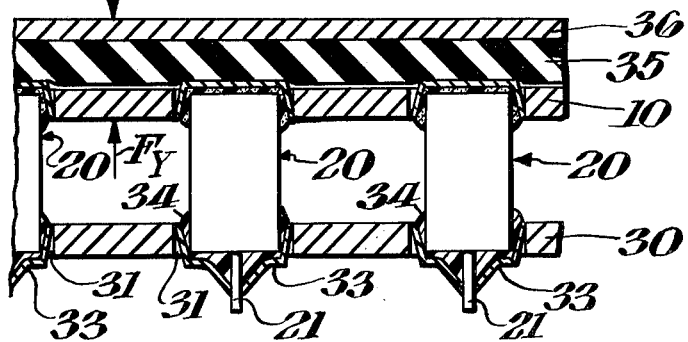
FIG. 5 shows in an enlarged side sectional view a solid electrolyte capacitor having been made by the method of this invention.
Figure 5:
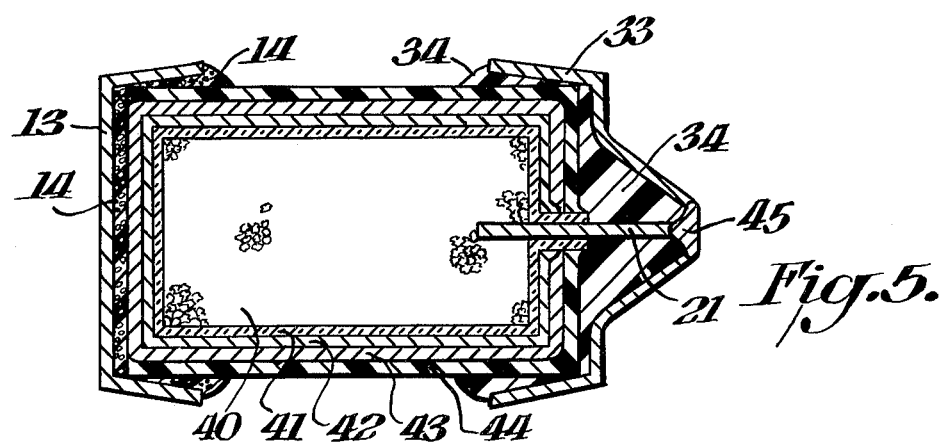

A capacitor made in accordance with the preferred method of this invention is shown in FIG. 5. The capacitor body 20, as seen in FIGS. 3 and 4, consists of a porous tantalum pellet 40; a film 41 of tantalum oxide serving as the capacitor dielectric layer; a solid electrolyte 42, preferably of manganese dioxide; a conductive counterelectrode 43 that may have a first sublayer of graphite overlaid with a layer of metal particles in a binder; and an organic insulative coating 44 such as a silicone resin. This coating may be applied by dipping the counterelectroded bodies that are welded to the holding bar 13 in the liquid resin, withdrawing the bodies and blotting the cathode end free of the resin. A more detailed description of such solid electrolyte valve-metal bodies and method for making same is given in U.S. patent application Ser. No. 666,727 filed Mar. 15, 1976 that is assigned to the assignee of the present invention.

When the resin bonding material 34 completely fills the space between the anode cup 33 and the insulating coating 44, the resin near the anode wire 21 and weld 45 burns during welding tending to spatter charred organic and metal particles onto the outer surfaces of the anode cup. To avoid such aesthetic marring of the unit, it may be desirable to leave an air space in the region about the anode wire. This may be accomplished at the resin dispensing step whereby resin is selectively dispensed essentially only on the inner faces of the cup side walls using a special peripheral dispensing needle with a baffled end.

What is claimed is:

1. A method for terminating solid electrolyte capacitors including providing a plurality of solid electrolyte capacitor bodies each of said bodies having an anode wire extending from an anode end thereof, and applying an insulating coating over said anode end and the adjacent sides of said each body so that the cathode counterelectrode is exposed at the opposite and namely the cathode end of said each body, wherein the improvement comprises:
   a. forming a plurality of rectangular cups of a thin metal, each of said cups having four sides and a bottom;
   b. pressing a first group of said metal cups into interference fitting rectangular holes, respectively, provided therefor in a first jigging strip, said holes being in a row and spaced therein at predetermined intervals and at predetermined orientations;
   c. pushing each of said cathode ends into one of said first group cups, respectively, after applying a conductive resin beween each of said cathode ends and the corresponding of said cups;
   d. curing said conductive resin;
   e. pressing a second group of said cups into interference fitting rectangular holes, respectively, provided therefor in a second jigging strip, said holes in said second strip being in a row and spaced therein at said predetermined intervals and predetermined orientations;
   f. pushing each of said anode ends into one of said second group cups, respectively, after applying a bonding resin between each of said anode ends and the corresponding of said second group cups;
   g. curing said bonding resin;
   h. making an electrical connection between each of said anode wires and the corresponding of said second group cups; and
   i. removing said jigging strips from said capacitor bodies.

2. The method of claim 1 wherein said bonding resin is an electrically conducting resin serving to electrically connect each of said anode wires to said corresponding cups of said second group.

3. The method of claim 1 wherein a hole is provided in the bottom of each of said second group cups, additionally comprising threading said anode wires into said cup holes prior to said pushing of said anode ends.

4. The method of claim 3 additionally comprising upsetting the bottoms of said second group cups about said bottom holes to form an outwardly protruding conical funnel for the purpose of facilitating said threading.

5. The method of claim 3 wherein said threading of all of said anode wires is accomplished simultaneously.

6. The method of claim 3 wherein said making an electrical connection consists of welding each of said anode wires to the corresponding of said second group cups.

7. The method of claim 1 additionally comprising spacing said plurality of bodies at said predetermined intervals in a row and holding said spaced bodies so that the anode leads thereof extend away in a mutually parallel direction, and then executing said pushing of all of said cathode ends simultaneously into said first group cups.

8. The method of claim 7, wherein said holding is accomplished by gripping said spaced capacitor bodies in a clamp.

9. The method of claim 1 additionally comprising spacing said plurality of bodies at said predetermined intervals in a row and holding said spaced bodies so that the anode leads thereof extend away in a mutually parallel direction, and then executing said pushing of all of said anode ends simultaneously into said second group cups.

10. The method of claim 1, wherein said predetermined intervals are mutually equal.

11. The method of claim 1, wherein said solid jigging strips are of a flat sheet material.

12. The method of claim 11, wherein the height as measured from the bottom to the lip of said first group cups is greater than the thickness of said first strip and additionally comprising seating said first group cups with each cup lip flush in a surface of said first strip prior to said pushing of said cathode ends.

13. The method of claim 12, wherein said removing of said first group cups is accomplished by simultaneously applying a force to the bottoms of said first group cups toward said first strip.

14. The method of claim 13, wherein said applying of said force is accomplished by compressing a resilient material against the outer surfaces of said bottoms of said first group cups.

15. The method of claim 1, wherein each of said bodies forms a right parallelepiped and said forming of said cups includes making the cavity of said cups essentially conform in peripherial dimensions to said ends of said capacitor bodies.

16. The method of claim 1 wherein each of said strips additionally contains a row of indexing holes that is essentially equidistant from said row of rectangular holes, said indexing holes being spaced at said predetermined intervals, additionally comprising sequentially positioning said rectangular holes in a work station by sensing said indexing holes.

17. The method of claim 1 wherein said forming includes flaring said cup sidewalls outwardly from said bottom.

* * * * *